United States Patent
Le et al.

(10) Patent No.: US 6,904,373 B2
(45) Date of Patent: Jun. 7, 2005

(54) USB-CONTROLLABLE POWER SUPPLY

(75) Inventors: Chanh Le, Beaverton, OR (US); Say Cheong Gan, Melaka (MY)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 10/261,118

(22) Filed: Sep. 30, 2002

(65) Prior Publication Data

US 2004/0064273 A1 Apr. 1, 2004

(51) Int. Cl.[7] .............................................. G06F 19/00
(52) U.S. Cl. ........................... 702/60; 702/57; 702/60; 702/117; 702/122; 702/189; 700/286; 700/297; 340/333; 340/425.1; 710/313
(58) Field of Search ............................. 702/57, 60, 117, 702/122, 123.1, 89, FOR 103; 700/286–298; 340/333, 425; 710/313

(56) References Cited

U.S. PATENT DOCUMENTS

| | | | | |
|---|---|---|---|---|
| 6,509,657 B1 | * | 1/2003 | Wong et al. | 307/66 |
| 6,541,879 B1 | * | 4/2003 | Wright | 307/31 |
| 6,564,275 B1 | * | 5/2003 | Chen | 710/107 |
| 2003/0163714 A1 | * | 8/2003 | Nortung | 713/189 |
| 2004/0019732 A1 | * | 1/2004 | Overtoom et al. | 710/313 |

OTHER PUBLICATIONS

Lynn, Universal Serial Bus (USB) Power Management, Apr. 1997, IEEE, pp. 434–441.*
Young et al., 'Universal Serial Bus Enhances Virtual Instrument–Based Distributed Power Monitoring', Dec. 2001, IEEE, pp. 1692–1697.*

* cited by examiner

Primary Examiner—Marc S. Hoff
Assistant Examiner—Elias Desta
(74) Attorney, Agent, or Firm—Blakley, Sokoloff, Taylor & Zafman LLP

(57) ABSTRACT

A USB (universal serial bus) controllable power supply and method for supplying power to a circuit board device under test (DUT) via a controllable power supply. The power supply employs a USB interface to communicate with external devices, such as a host computer. In response to power supply control commands from the host computer, the controllable power supply provides various power outputs at various external connectors, including main power, ATX12V power, and peripheral power to be used for peripheral devices corresponding to a DUT test apparatus. The controllable power supply also provides a built-in short circuit check function, and monitors the voltage levels of its power outputs to ensure they are within predefined limits. The power supply also supports emergency shutdown operations, and provides an EOS (emergency overstress) function. In one embodiment, the power supply includes an integrated USB hub.

30 Claims, 16 Drawing Sheets

USB-CONTROLLABLE POWER SUPPLY

CROSS-REFERENCE TO RELATED APPLICATIONS

The present application contains subject matter related to concurrently filed U.S. application Ser. No. 10/261,055, filed Sep. 30, 2002, entitled "UNIVERSAL AUTOMATED CIRCUIT BOARD TESTER."

FIELD OF THE INVENTION

The field of invention relates generally to computer systems and, more specifically but not exclusively relates to an apparatus and method for providing power to various circuit boards in a test environment.

BACKGROUND INFORMATION

It is a common practice to perform testing of circuit boards, such as computer system boards (i.e., motherboards and the like) prior to their sale or use in a computer system product. For example, as computer system boards have evolved, an ever-increasing level of functionality has been built into the boards, such as integrated video subsystems, audio systems, network interfaces, modem circuitry, and the like. Testing to verify the integrity of such functionality is often performed during quality control operations, either on an individual board basis, or using a random sampling scheme.

Generally, computer system boards are tested in the following manner. The board is mounted or otherwise coupled to a test plate or the like, and a plurality of input connectors are manually mated with corresponding system board connectors to provide input power signals to the system board and to coupled input/output (I/O) ports and the like to electronic test equipment that is used to test the performance of the system board via a variety of test operations. Additional manual operations typically include insertion of memory and/or microprocessors. This is a very laborious process, and is also very time-consuming. As a result, the test throughput is low, and test costs are excessive.

In addition, when different types of computer system boards are to be tested, the test environment will often require a uniquely-configured test station for each type of board. For example, different system board types may require different power supply inputs, and/or may have different memory slot locations. Accordingly, the test station used to perform testing of such system boards must be configured to accommodate any unique characteristics of the system boards. This adds to the expense and complexity of a test environment. Furthermore, when the computer system board for a particular test station is phased out of production, the test station is often scrapped, as it cannot be used to test other types of system boards.

In addition to physical interfaces, there may also be a need to provide power inputs to the test circuit boards in a particular manner. For example, many computer system boards require a specific power sequence to be applied during boot-up and shutdown. Presently, a specific power supply type for a given type of computer system board (in regards to power input requirements) would generally be required to facilitate testing of different board types.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of an apparatus and method for providing power to different types of devices under test (DUT) while performing automated testing of circuit boards, such as computer system boards and the like are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
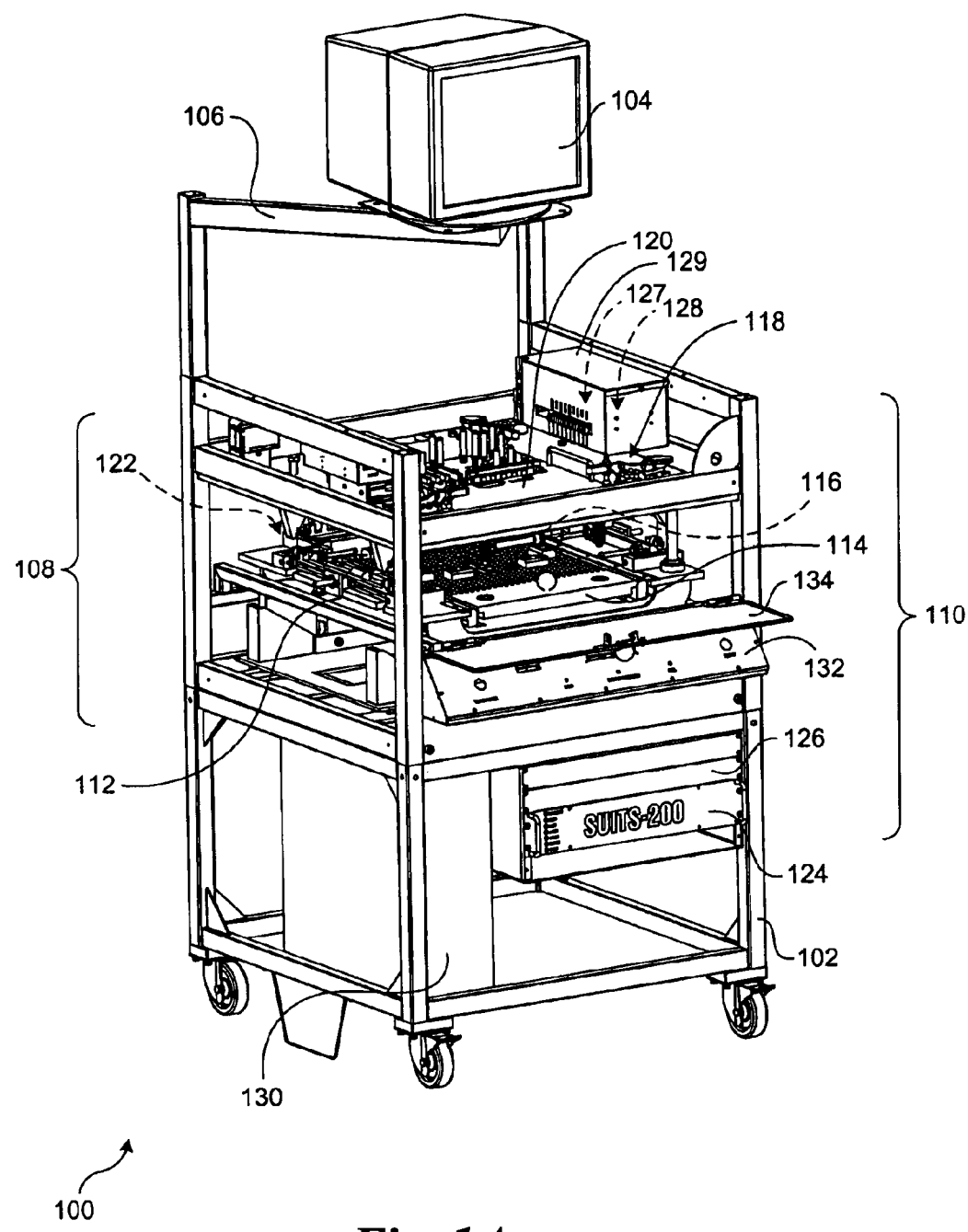
FIGS. 1A and 1B respectively show front and rear isometric views of an automated universal circuit board tester including a USB-controllable power supply in accordance with one embodiment of the invention.
Figure 1B:
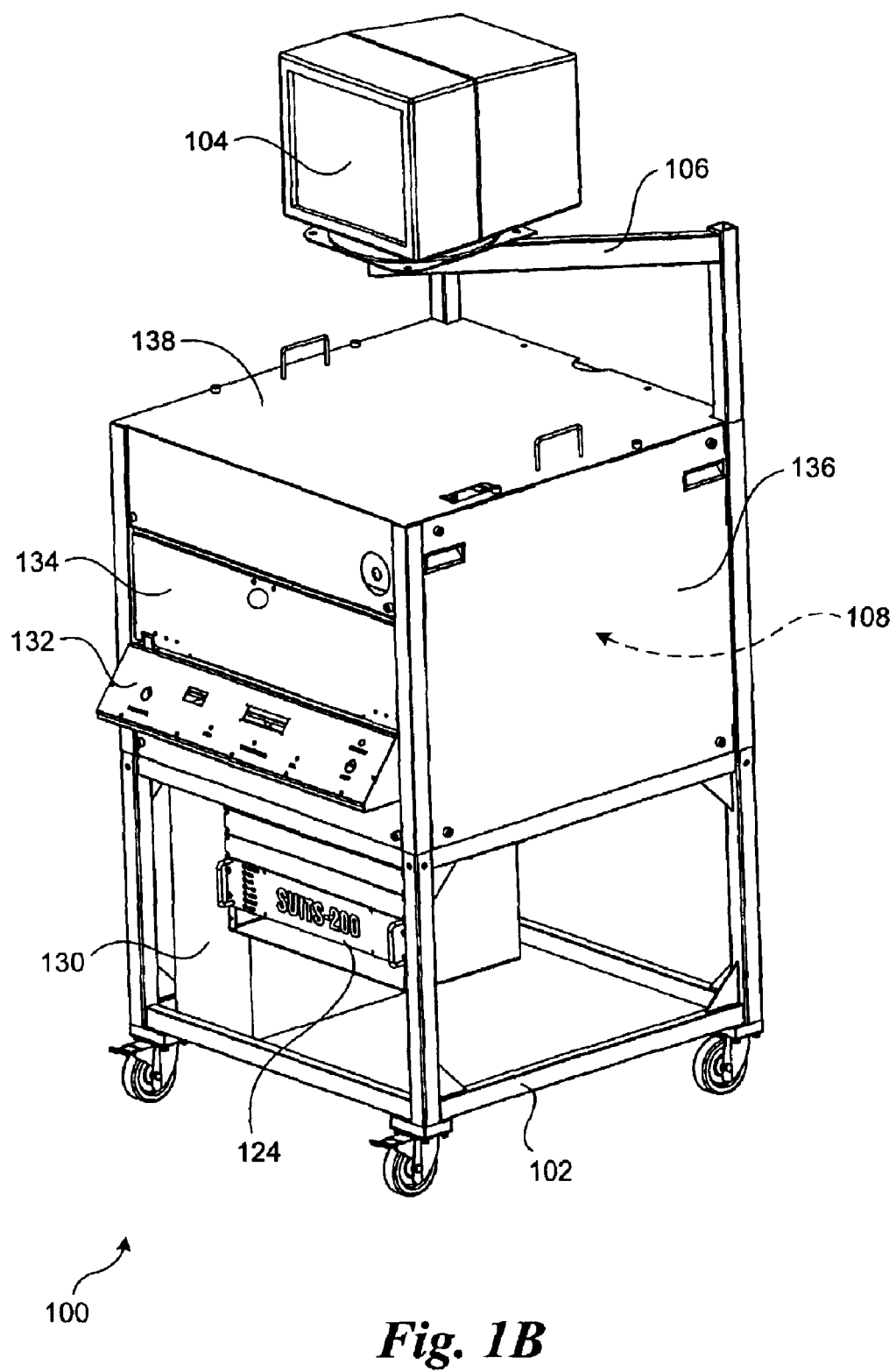

An overview of an automatic circuit board tester 100 corresponding to a Scalable Universal Integrated Test System (SUITS) in which embodiments of the invention may be employed is shown in FIGS. 1A and 1B. Automated circuit board tester 100 includes a frame 102 to which a monitor 104 is attached via a boom 106. An automated connector insertion/probe mechanism 108 is housed within the frame, along with test electronics 110. The automated connector insertion/probe mechanism employs a carrier assembly 112 including a carrier plate 114 to which a circuit board comprising a device under test (DUT) 116 (not shown) is coupled during testing. The mechanism further includes a universal cassette 118 to which a replaceable top probe/connector plate 120 is attached, and a replaceable side access unit (SAU) 122 that is used to connect to various I/O port connectors generally disposed at the rear of the DUT.

The test electronics include various circuit boards that are configured to support a universal test environment via a common (Universal Serial Bus (USB)) communication interface, whereby circuit boards having different configurations may be tested using a common (i.e., universal) tester. This is facilitated, in part, by a universal power supply (UPS) 124 that receives power from a power distribution unit (PDU) 126 and supplies power to DUT 116 and other test electronics components. The test electronics further include a digital video measurement unit (DVMU) 127 and combo board 128 (both hidden in FIG. 1A) used for audio, analog/digital video and USB 2.0 testing contained within a housing 129 mounted to universal cassette 118.

In general, test operations are controlled by a host computer 130, disposed toward the bottom of the frame, which is linked in communication with the test electronics via USB and serial communication links. More specifically, the host computer is used to execute software comprising a universal host controller (UHC) that is used to control testing of the DUT. The system also includes a control panel 132 to enable user interaction, and provides an access door 134 to allow the DUT to be loaded and to prevent access to the DUT (and associated test electronics) during testing. Furthermore, the tester includes removable side and top panels 136 and 138 that are installed during testing operations so as to prevent access to the DUT and tester electronics, as shown in FIG. 1B.

Figure 2:
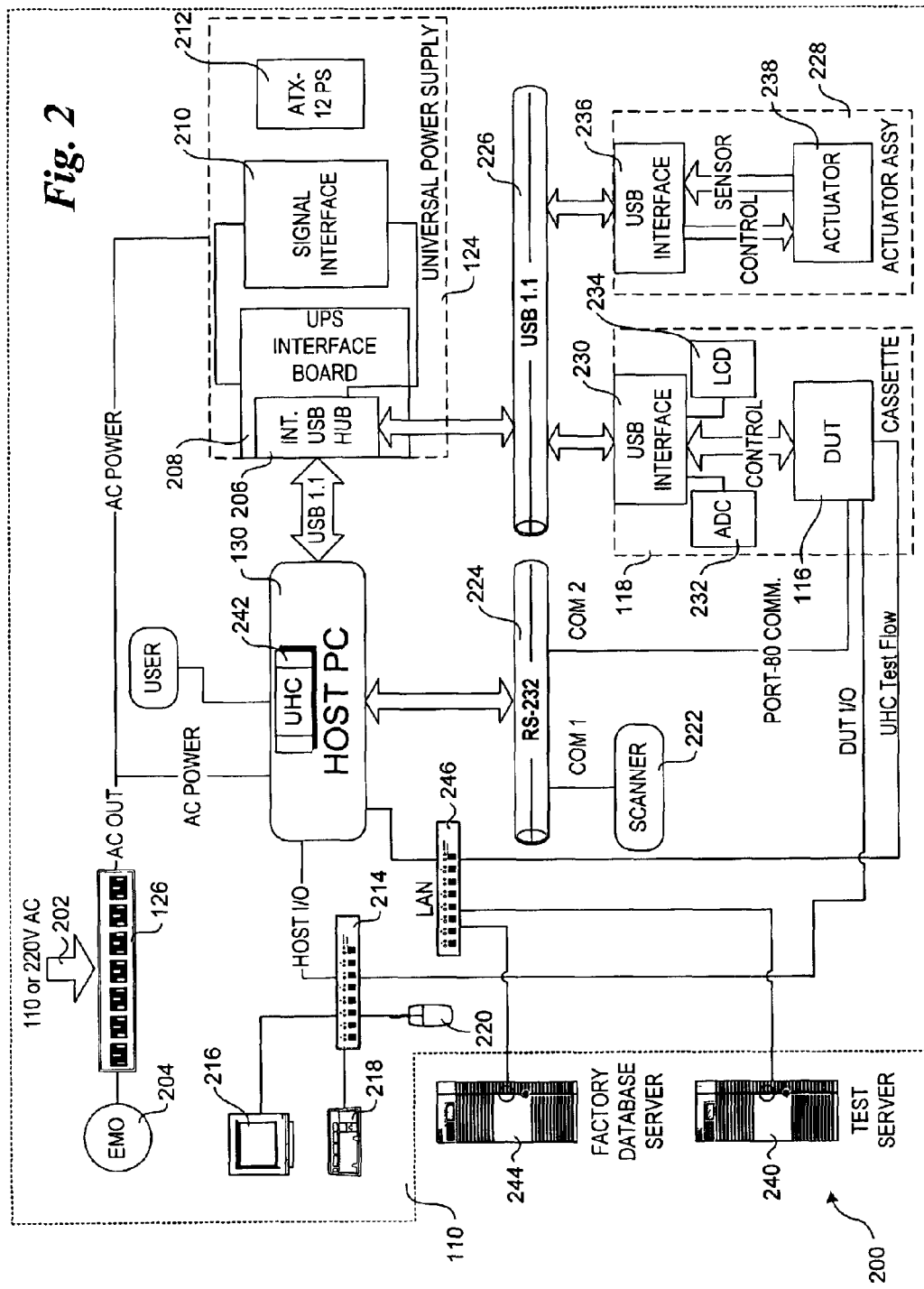
FIG. 2 is a block schematic architecture diagram illustrating various electronic components and interfaces employed by the universal circuit board tester of FIG. 1.

A high-level architecture diagram 200 corresponding to test electronics 110 is shown in FIG. 2. As depicted, an AC power input 202 is supplied to PDU 126. An emergency off (EMO) circuit, depicted as an EMO control 204, provides an input signal to PDU 126 to shut off the output of the PDU upon detection of an emergency off condition and/or activation of an EMO switch (e.g., via operator activation of an emergency off button on the control panel 132). The PDU provides AC power to various system components, including host computer 130 and UPS 124. In one embodiment, the PDU is manufactured by Pulizzi Engineering Inc, Santa Ana Calif.

At a high level, UPS 116 includes an internal USB hub 206 coupled to a UPS interface board 208, a signal interface board 210, and an ATX-12 power supply 212. Further details of the UPS are discussed below with reference to FIGS. 5 and 6.

A first set of I/O cables are connected between host computer and a peripheral device (i.e., I/O) switchbox 214 to enable communication between a monitor 216, keyboard 218, and mouse 220 and the host computer via a second set of I/O cables. A barcode scanner 222 is also linked in communication with the host computer, this time via an RS-232 (i.e., serial) link 224. The RS-232 link further facilitates communication between the host computer and DUT 116 via a port-80 communication channel, wherein this communication link is used for displaying POST (Power On Self Test) codes, as describe below.

The internal USB hub 206 of the UPS serves as a gateway to a USB bus 226, which is used to enable communication with test electronics coupled to universal cassette 118, and to control an actuator assembly 228 that is used to automatically insert various connectors into the DUT and couple various probes to circuitry and components disposed on the DUT. The universal cassette electronics include a USB interface 230, analog to digital conversion (ADC) electronics 232 to measure various power signals at the DUT, and a liquid crystal display 234 that is used to report (i.e., display) various information during the testing operations. The actuator assembly electronics include a USB interface 236, which is used to provide control signals to an actuator 238 and monitor sensor signals from the actuator.

Generally, a plurality of automated circuit board testers 100 may be used in a factory test environment. In one aspect of this type of implementation, a test server 240 is used to host various UHC software versions, whereby appropriate versions of the UHC software 242 may be downloaded from the test server to be executed by a host computer. In another aspect of this type of implementation, a factory database server 244 may be provided to store test results and to retrieve configuration information. As will be readily apparent to those skilled in the art, a single server may be implemented to host the functions provided by both the test server and the factory database server in accordance with one embodiment. Generally, host computer 130 will be linked in communication with the servers via a local area network (LAN) connection, such as an Ethernet link. Such a link may be facilitated by a network switch 246, which may be incorporated into the tester or may comprise part of the LAN infrastructure.

Figure 3:
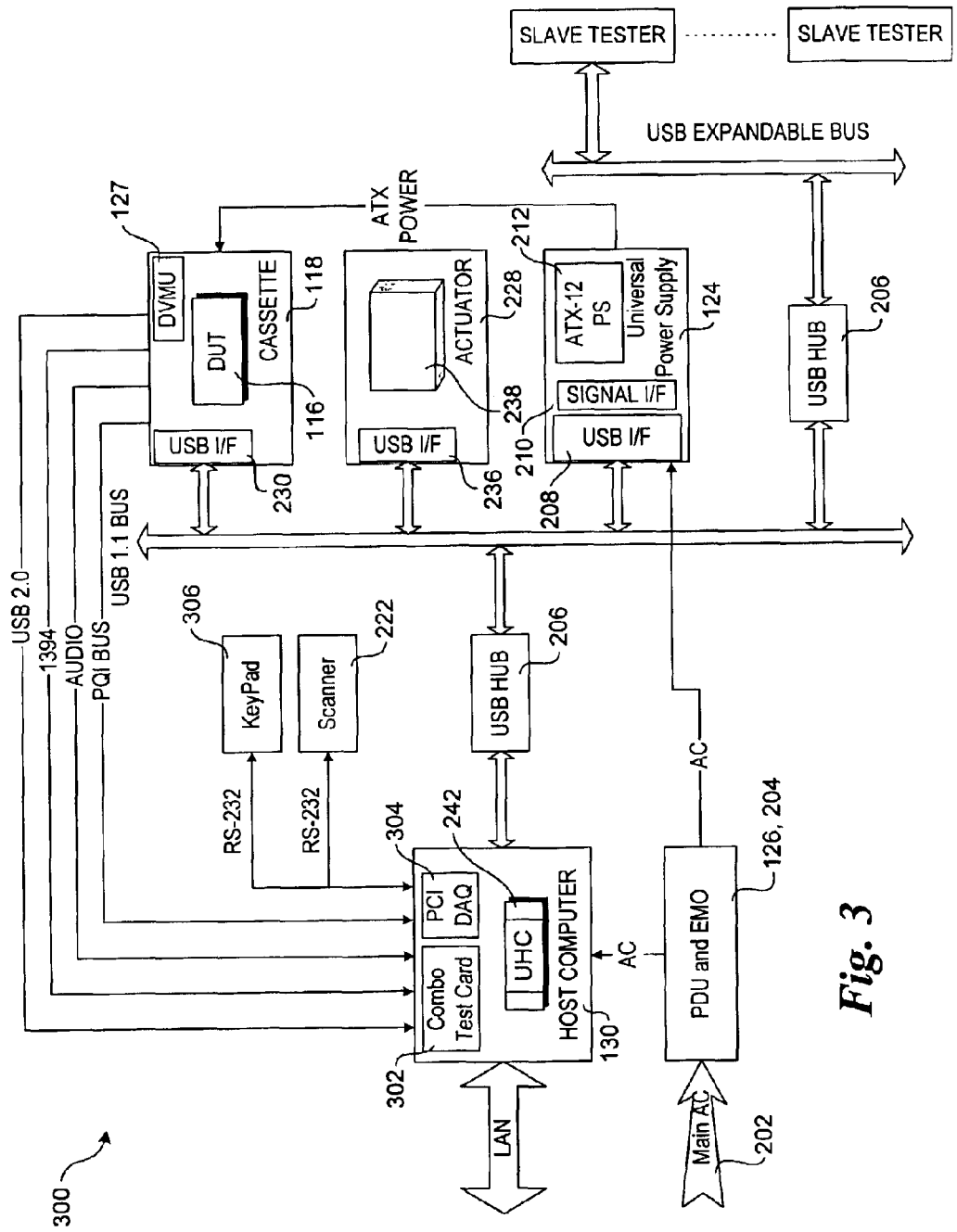
FIG. 3 is a block schematic diagram illustrating various communication paths employed by one embodiment of the automated universal circuit board tester.

A high-level communications diagram 300 is shown in FIG. 3. Host computer 130 is shown to further include a combo test card 302 and a data acquisition (DAQ) unit 304. A keypad 306 has also been added. In general, appropriate cabling and connectors are provided to support communication between the host computer, the universal cassette test electronics, and the DUT over various communication channels. In the illustrated embodiment, these communication channels include a USB 2.0 channel, an IEEE 1394 channel, an Audio channel, and a PQI (prediction quality indicator) bus interface.

Figure 4:
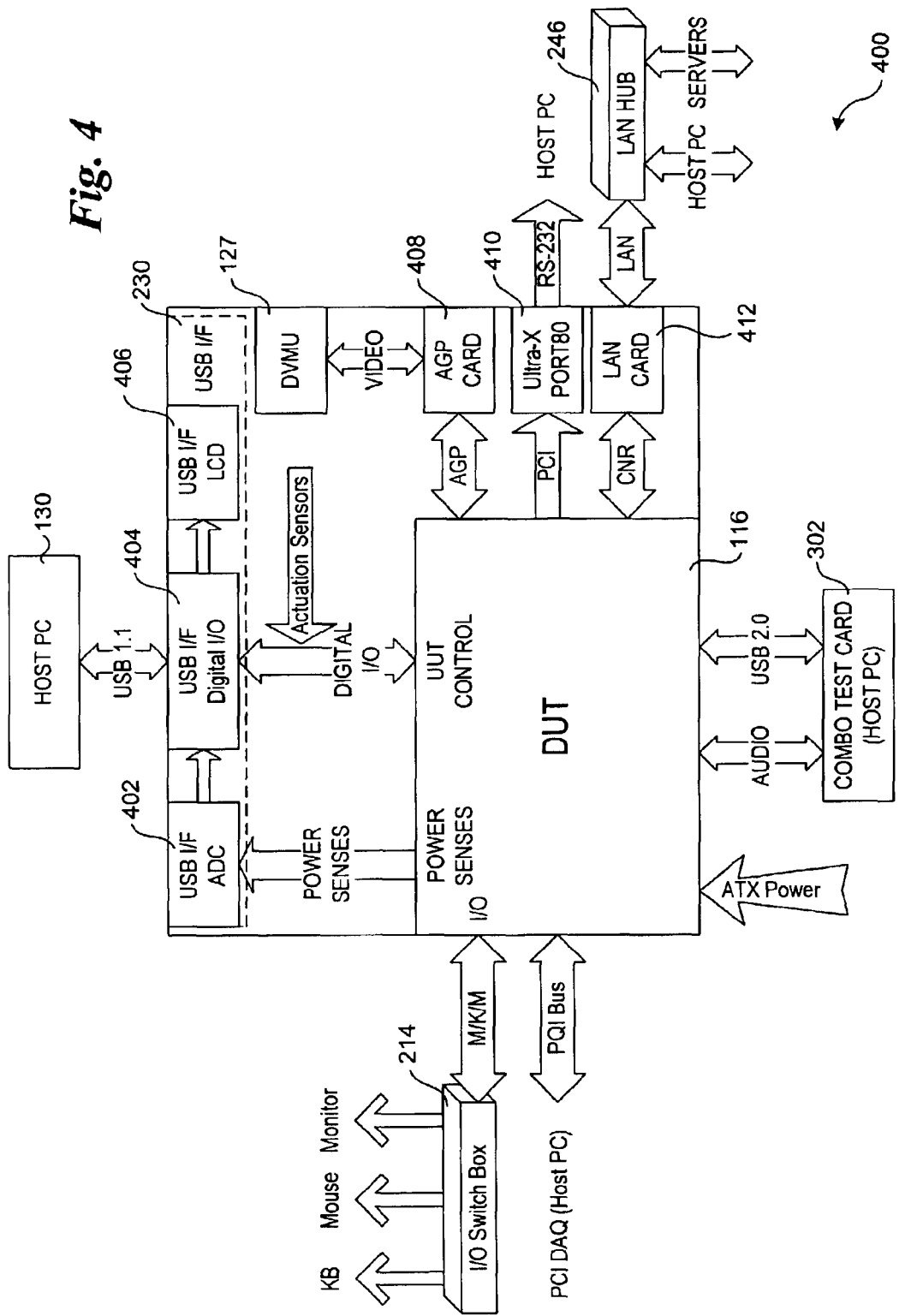
FIG. 4 is a block schematic diagram illustrating electrical components and interfaces employed a top probe unit in accordance with one embodiment of the invention.

An architecture diagram 400 corresponding to a Top Probe Unit (TPU) comprises test electronics that are operatively coupled to the DUT during testing is shown in FIG. 4. The TPU is a USB slave device that includes multiple USB interfaces (I/F), including an USB-to-ADC (analog-to-digital conversion) interface 402, a USB Digital I/O interface 404, and a USB LCD interface 406. In one embodiment, each of USB interfaces 402, 404, and 406 are facilitated by corresponding ActiveWire® USB interface modules, manufactured by ActiveWire, Inc., Palo Alto Calif. The TPU further includes an Advanced Graphic Port graphics card 408 that is operatively coupled to the AGP bus on the DUT during testing, and an Ultra-X Port 80 RS-232 PCI interface card 410 that is operatively coupled to a PCI expansion bus slot on the DUT. In one embodiment, the TPU further provides a LAN network interface card (NIC) 412 that is connected to an appropriate PCI expansion bus slot on the DUT. Optionally, for DUT's with built-in NIC support, that LAN interface is facilitated by a connector connected to the back of the DUT (not shown).

Figure 5:
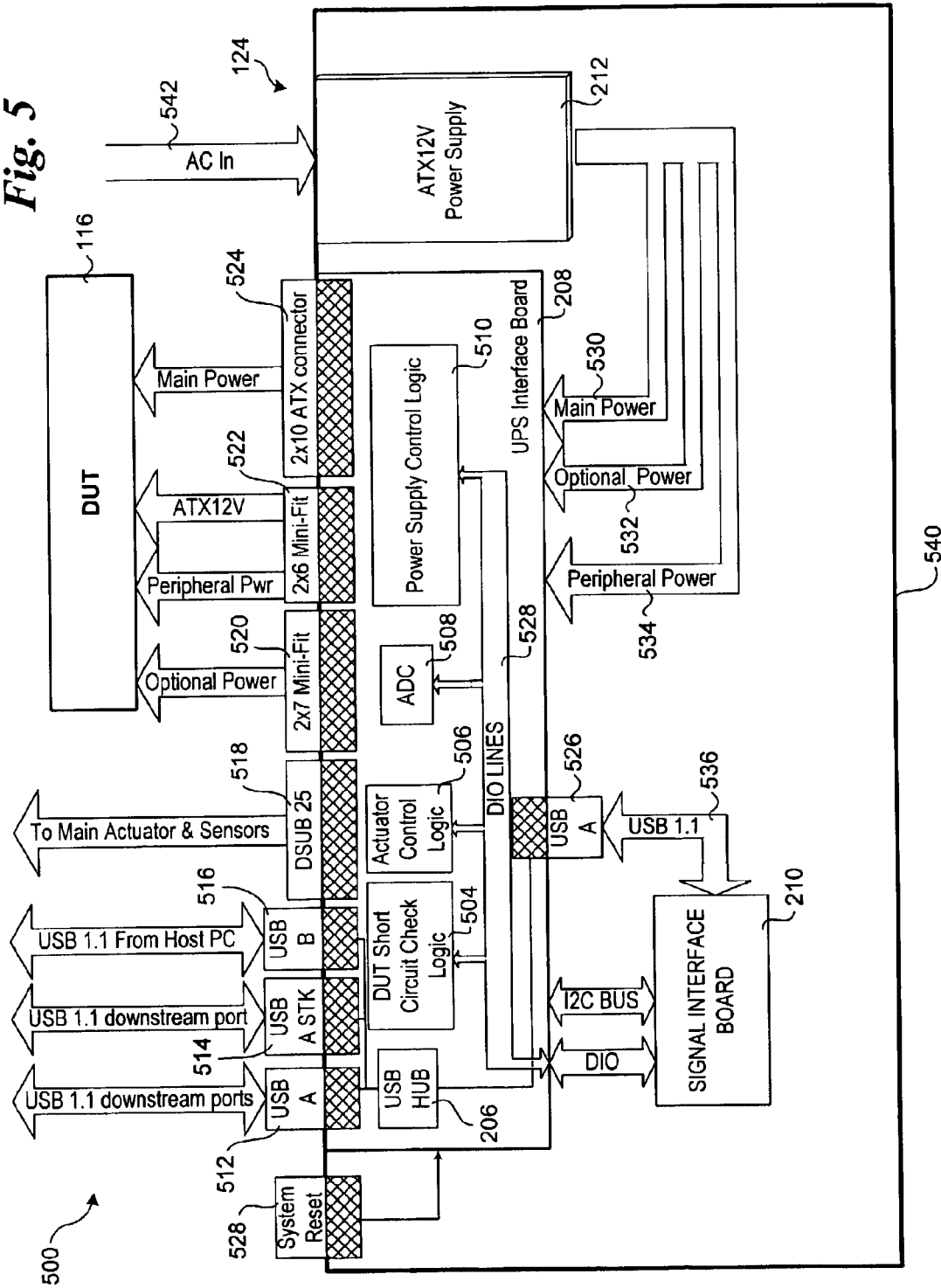
FIG. 5 is a block schematic architecture diagram illustrating various components and logic blocks employed by a universal power supply in accordance with one embodiment of the invention.
Figure 6:
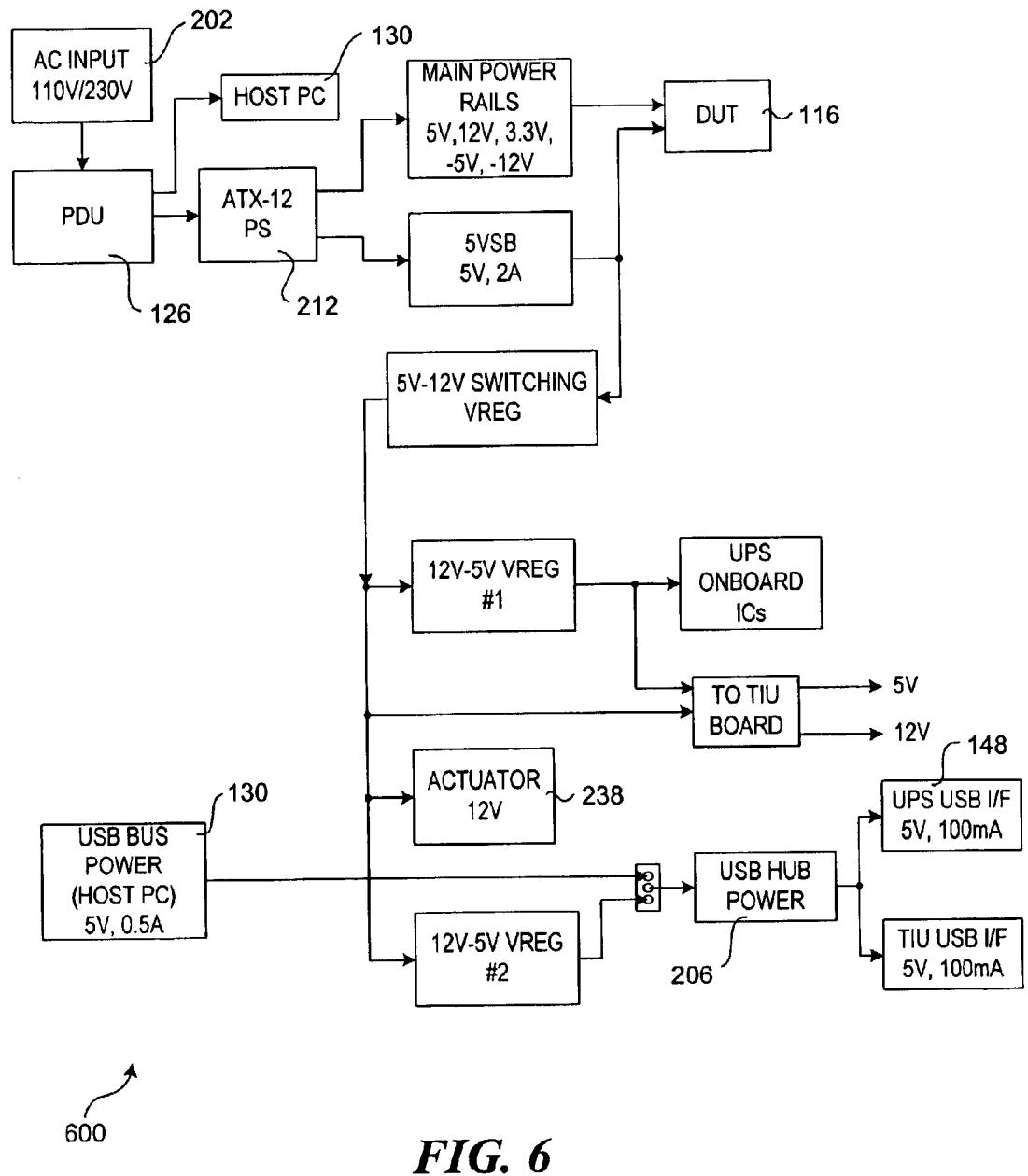
FIG. 6 is a power distribution diagram employed by one embodiment of the invention.

An architecture block diagram 500 corresponding to one embodiment of universal power supply 124 is shown in FIG. 5, while a corresponding power distribution diagram 600 is shown in FIG. 6. The diagram now shows further details of UPS interface board 208, which performs several test control operations, and includes interface circuitry and corresponding interface connectors. In addition to USB hub 206, the UPS interface board includes programmable circuitry corresponding to a DUT short circuit check logic block 504, an actuator control logic block 506, analog-to-digital conversion operations corresponding to an ADC block 508, and power supply control logic, depicted by a block 510.

As discussed above, the universal power supply supplies power to the various circuit board types supported by the system. In cases in which the DUT comprises a computer system board, appropriate power input must be supplied to DUT, typically in response to power input sequencing signals provided by the DUT. Under normal (i.e., non-test) use, a computer system board will typically be housed in a chassis that also includes a power supply configured to support the computer system board type. During boot-up operations, power sequencing signals are generated by the computer system board and supplied as input signals to the power supply, which outputs corresponding power levels on various wires in response thereto. Through the use of power supply control logic block 510 and other control aspects, the universal power supply is able to provide appropriate power sequencing and power levels to a variety of different board types.

The universal power supply includes several interface connectors for data communications and power input functions. These include, external USB ports 512, 514, and 516, a 25-pin DSub connector 518, a 2×7 Mini-fit connector 520, a 2×7 Mini-fit connector 522, and a 2×10 ATX power connector 524. Each of these connectors are standard well-known connectors that are mounted to the UPS interface board 208, and are disposed at the back of the UPS housing to enable cable access to the connectors. An internal USB port 526 is also mounted to the UPS interface board to enable communication via a USB link with signal interface board 210. Each of the USB ports is internally linked to USB Hub 206, thereby enabling signals received or sent via USB port 516 to be passed to the other USB ports. The UPS also provides a connector 528 via which a system reset signal may be received to cause a system reset operation to occur.

Power input is supplied to the DUT via cables connector to connectors 520, 522, and 524. The power is originally supplied as inputs to UPS interface board 208 from ATX power supply 212, as depicted by a "Main Power" input 530, an "Optional Power" input 532, and a "Peripheral Power" input 534. The UPS interface board then provides appropriate power to DUT 116 as defined by the power supply control logic in response to applicable power sequence/control signals.

In accordance with one aspect of the universal power supply, the device may be entirely controlled by host computer 130 via a single (USB) communication interface. USB hub 206 also enables USB communication signals to be routed over other USB links. This enables USB communication with other components of a given system. It also enables multiple test stands to be linked together in a daisy-chain fashion, thereby enabling a signal host computer to control multiple test stands. A further aspect of the USB control scheme corresponds to the ability to communicate with downstream components that are not linked to the UPS (or even the host PC) via a USB link.

The UPS includes a means for measuring the voltage levels of the power input supplied to the DUT via ADC 508. In one embodiment, the ADC comprises a 10-bit resolution ADC, model number TLV1548C manufactured by Texas Instruments. During the testing, the voltage levels are monitored to verify they fall within predefined limits. If a voltage level limit is exceeded (over-voltage or under-voltage), the power supply control logic will detect the condition and shut down the power supply output to the DUT.

The signal interface board 210 is used to provide an interface between USB signals, and other data signals used by the UPS interface board, as respectively depicted USB 1.1 signals 536 and DIO (digital input/output) lines 538. For example, signal interface board 210 provides a communication interface that enables actuator command signals corresponding to a predefined command set to be sent over a USB link to the UPS (e.g., via USB port 516 from the host computer), whereupon they are received by the signal interface board, and converted into DIO-compatible signals that are passed to actuator control logic block 506. The actuator control block interprets the signals it receives, and causes an appropriate control signal to be sent to the actuator via 25-pin DSub connector 518. This signal interface also supports communication back to the host PC over the USB link, such as providing the results of the short circuit test operations described below, which is performed by DUT short circuit check logic 504.

The UPS also proves an EOS (Electrical Overstress) function. The EOS function may be turned on and off via an EOS_CTRL signal that is received via a USB link. This function is turned on at the end of a test (after power off) to ensure that all the power rails on the DUT are properly drained to ground.

In general, the various components of the USB described above will be packaged within a housing 540. In one embodiment, the housing corresponds having a 2U rack-mountable form factor. The housing is configured such that each of the connectors disposed at the top side of the unit are accessible. Additionally, AC input power 542 may be supplied to power supply 212 via a conventional power input connector, such as a Beldon connector.

Universal Host Controller Software

As discussed above, control of the testing operations is provided, in part, by universal host controller software 242 running on host PC 130. A flowchart illustrating various operations performed during a test sequence in accordance with one embodiment of the invention is shown in FIGS. 7a–h. The process begins in a block 700, wherein a user scans the serial number of the DUT (e.g., computer system board) with scanner 222, wherein the UHC software reads the serial number via the RS-232 connection with the scanner. In response, the host computer submits a request to factory database server 244 in a block 702 to obtain permission for the DUT to be tested. The database will also provide the product code and operation ID (OPID) information of the DUT. The OPID will tell the UHC software if the DUT is at a valid location in the factory, for this case, the SUITS-200 Functional Test area. UHC uses the product code information to verify that the DUT is tested with the correct probe plate and side-access unit (SAU).

In blocks 704, 706, and 708, an operator puts the DUT on the carrier plate, pushes the carrier plate in, and closes access door 134, respectively. The operator then presses the START button on control panel 114 to initiate the beginning of the automated test process, as depicted by a block 710. The UHC detects the start of the test by monitoring for a corresponding start signal on USB interface 230. Upon detecting a valid start signal, a stop# bit is checked in a block 712 to determine whether the tester is available or is locked. Continuing to FIG. 7b, if the stop# bit is asserted (low), the UHC software reports that the tester is locked, in accordance with a decision block 714 and a block 716. If the bit is not asserted, a timestamp indicating the start of the test is recorded and displayed on LCD 234.

Next, in a block 718, the carrier plate sensor is checked to verify the carrier plate is in the proper position. If it is not, the test is stopped, and the UHC software reports (via LCD 172) that the carrier plate is not closed in accordance with a decision block 720 and a block 722. In a block 724, the door sensor is checked. If the sensor indicates the door is not locked, the test is stopped and the UHC software reports that the door is not closed in accordance with a decision block 726 and a block 728. If the door is in its proper position, the door is automatically locked in a block 728 via actuation of an electronic lock 962.

Figure 7A:
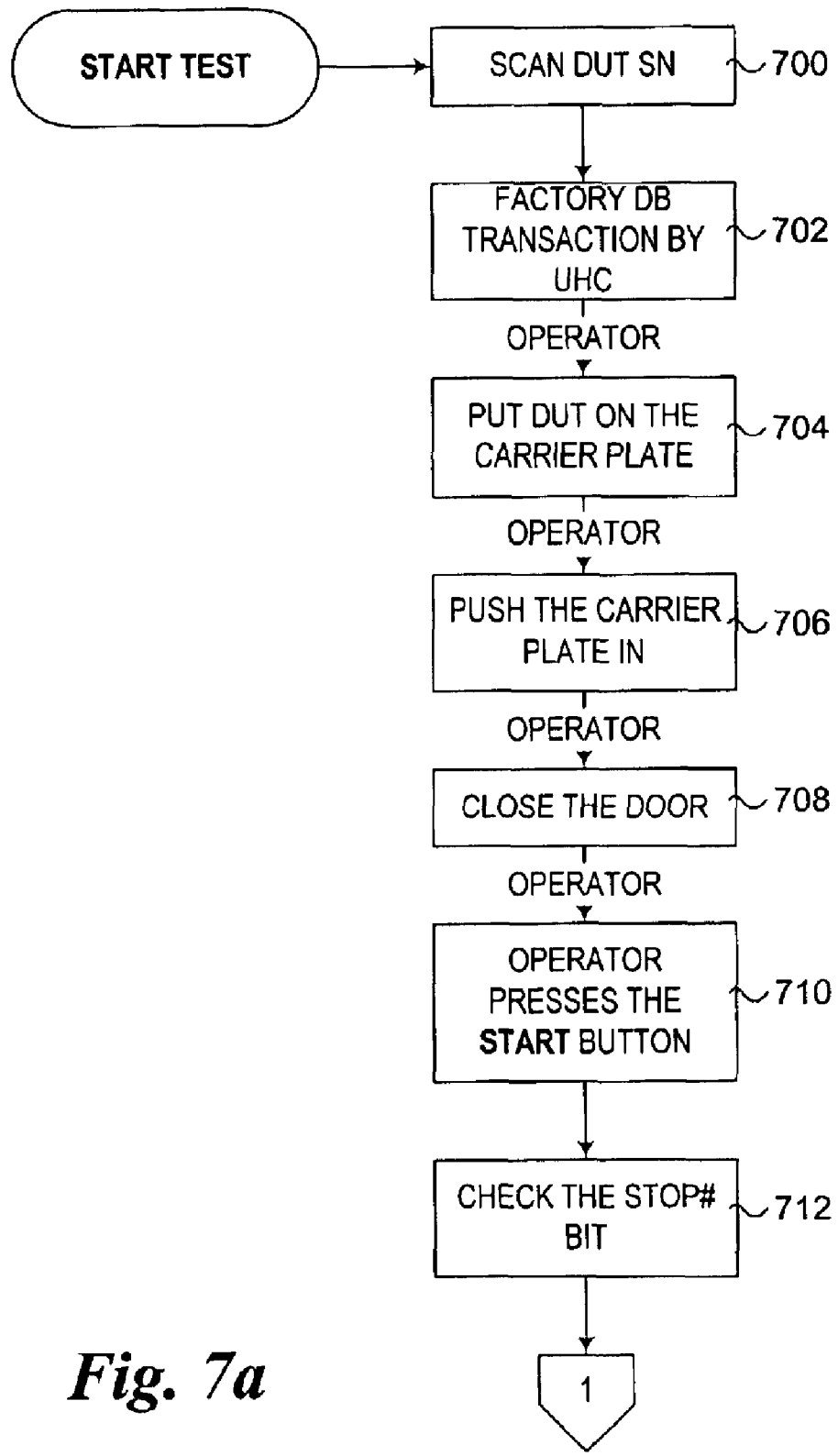
FIGS. 7a–h collectively comprise a flowchart illustrating operations and logic performed by the tester during test operations in accordance with one embodiment of the invention.
Figure 7B:
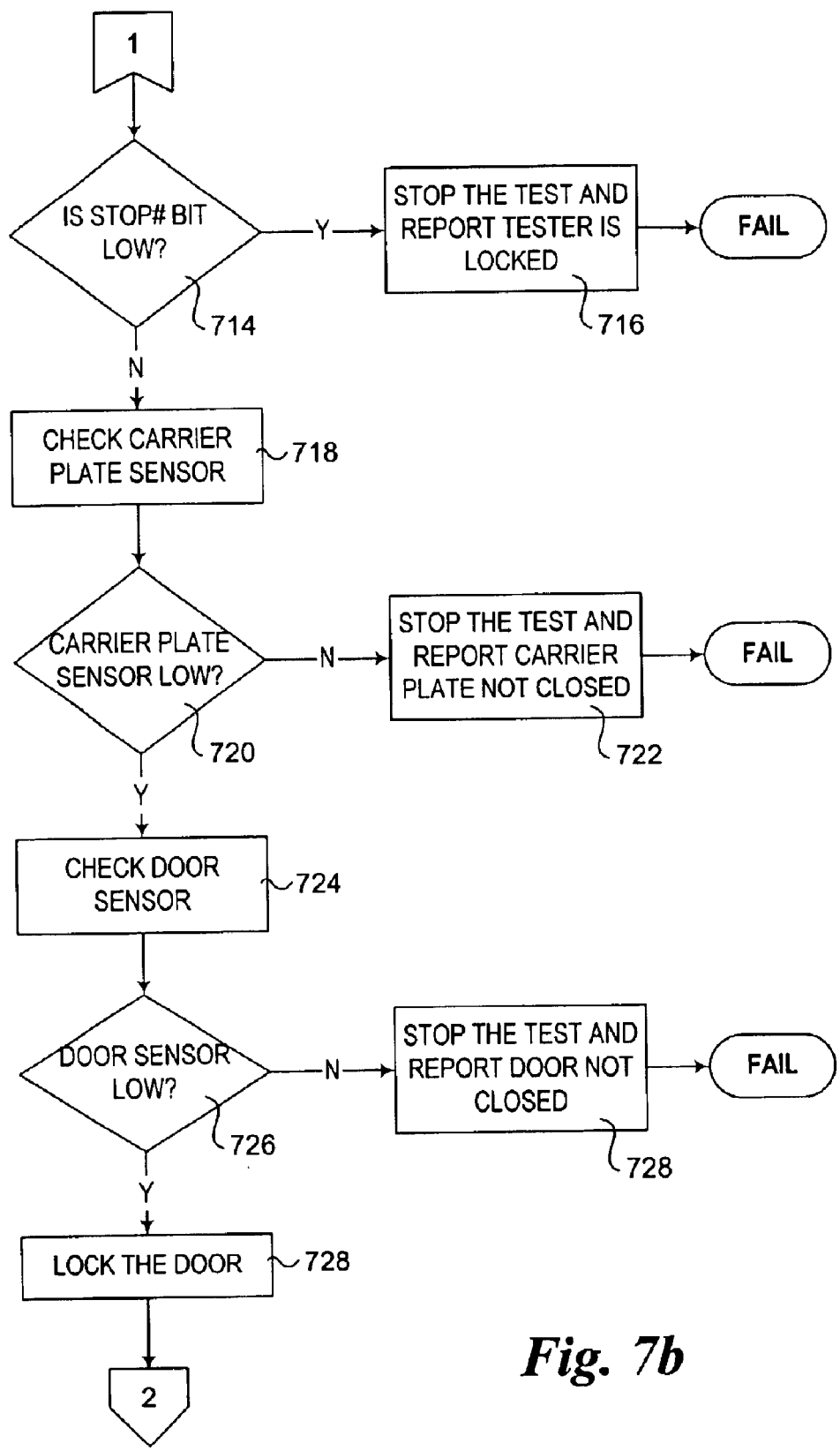
Figure 7C:
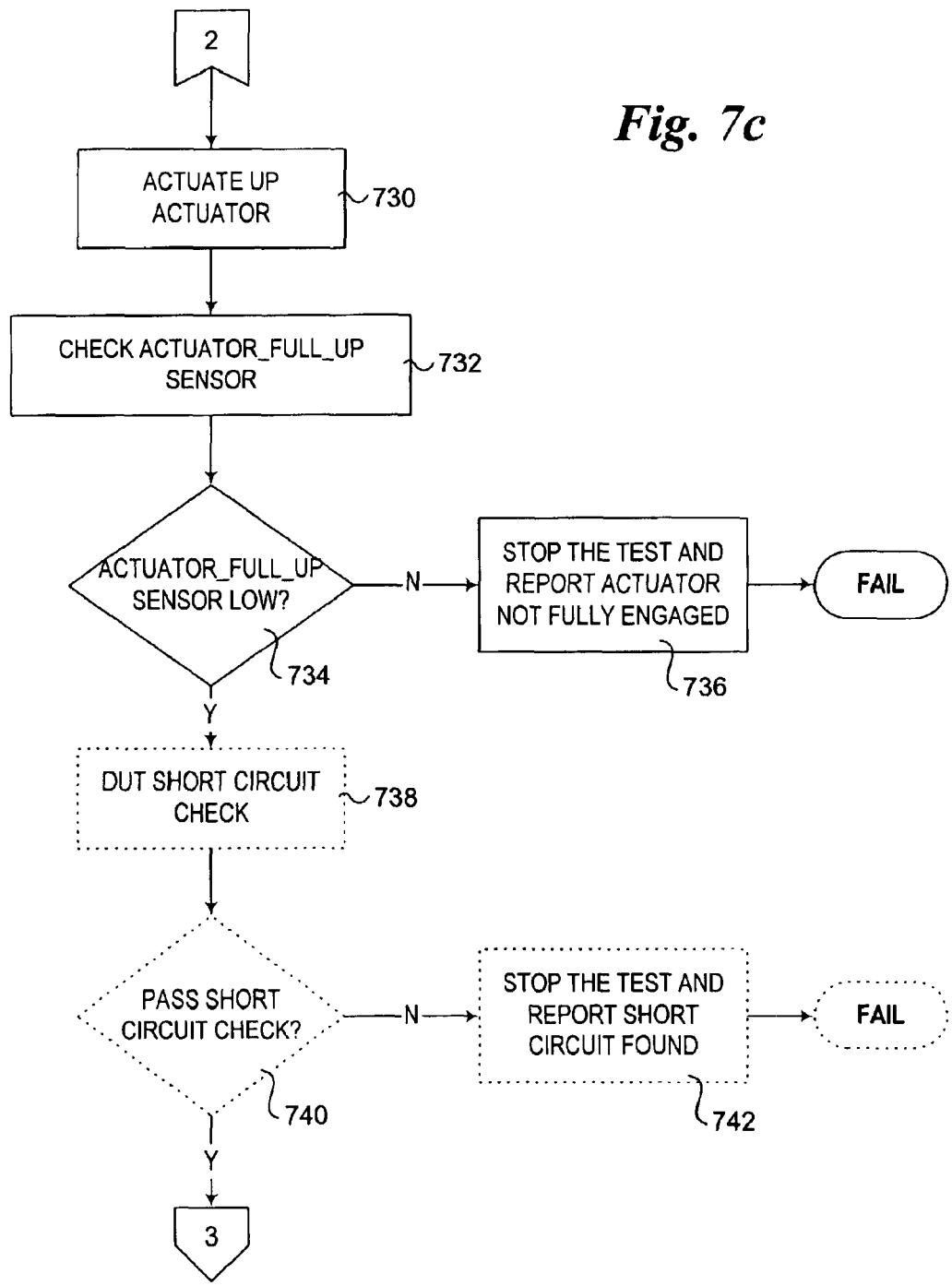

Moving forward to FIG. 7c, the up actuator (i.e., pneumatic cylinder 900) is actuated in a block 730. This causes the DUT to be raised into contact with corresponding connectors and test probes disposed on the underside of the universal cassette 118 and top connector/probe plate 120. It also positions SAUs 122 to engage various connectors disposed at the rear and/or sides of the DUT. In a block 732, the ACTUATOR_FULL_UP sensor (960) is checked, and a determination of its position is made in a decision block 734. If the actuator not is fully engaged, the ACTUATOR_FULL_UP sensor will read low, causing the test to be stopped and the UHC software to report that the actuator is not fully engaged in a block 736.

Once the actuator is fully engaged, a DUT short circuit test is performed in a block 738, further details of which are discussed below. In a decision block 740 a determination is made to whether the short circuit test is passed. If it has not, the test is stopped and the UHC software reports that a short circuit has been found in a block 742. As indicated by the dashed outline of the blocks, the short circuit test is an optional test, which may be enabled by a corresponding entry in a software initialization file.

Figure 7D:
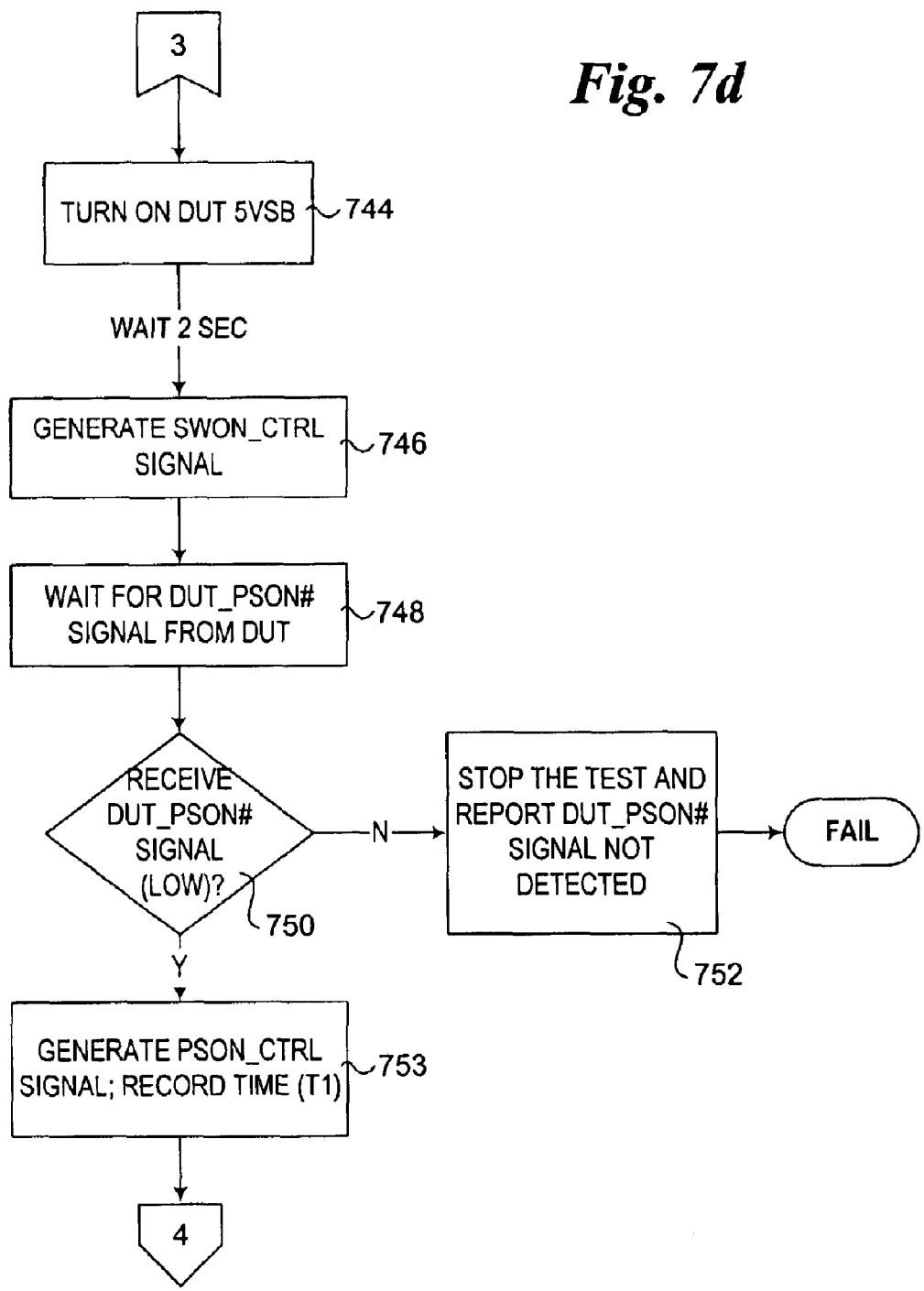
Figure 7E:
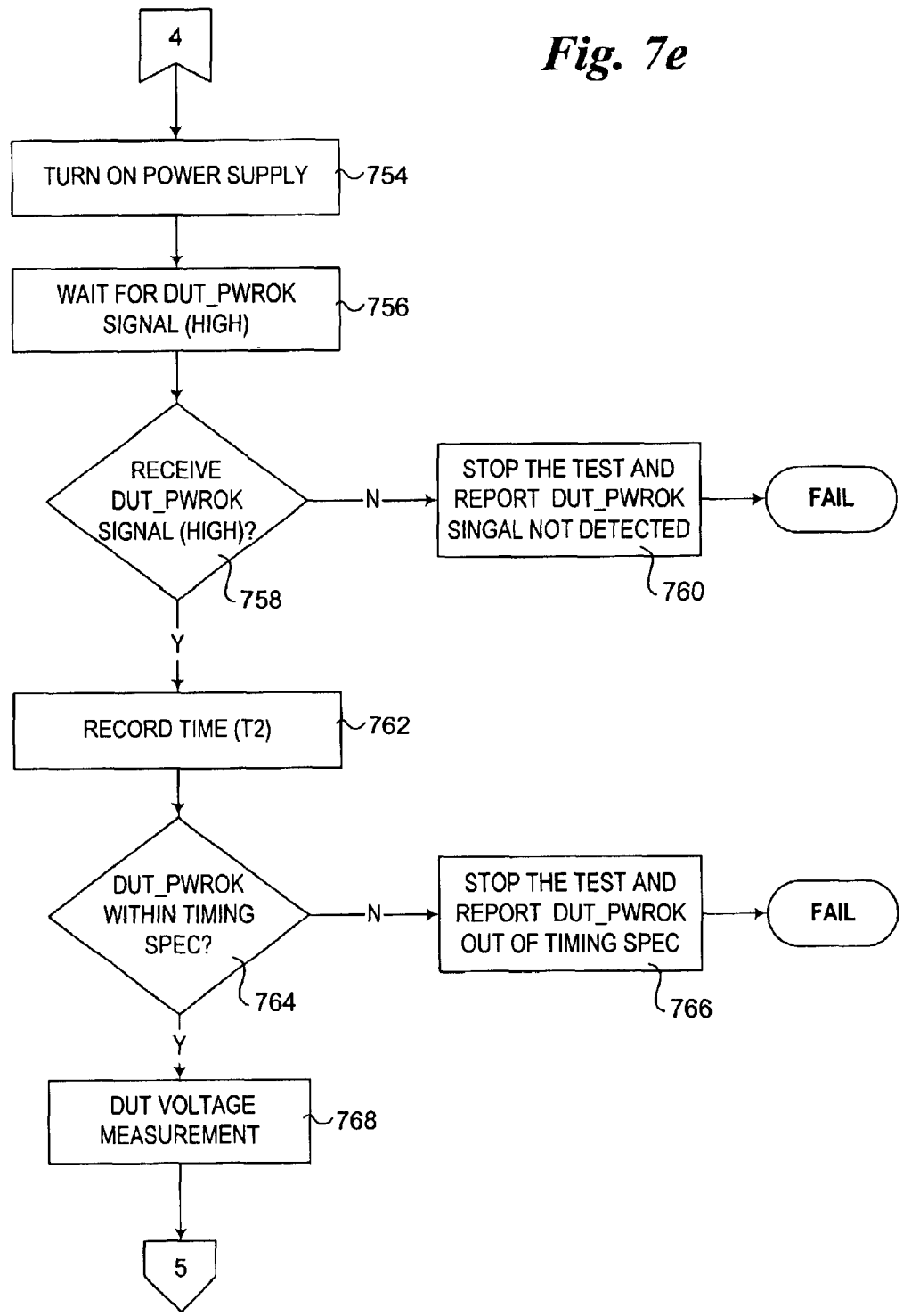
Figure 7F:
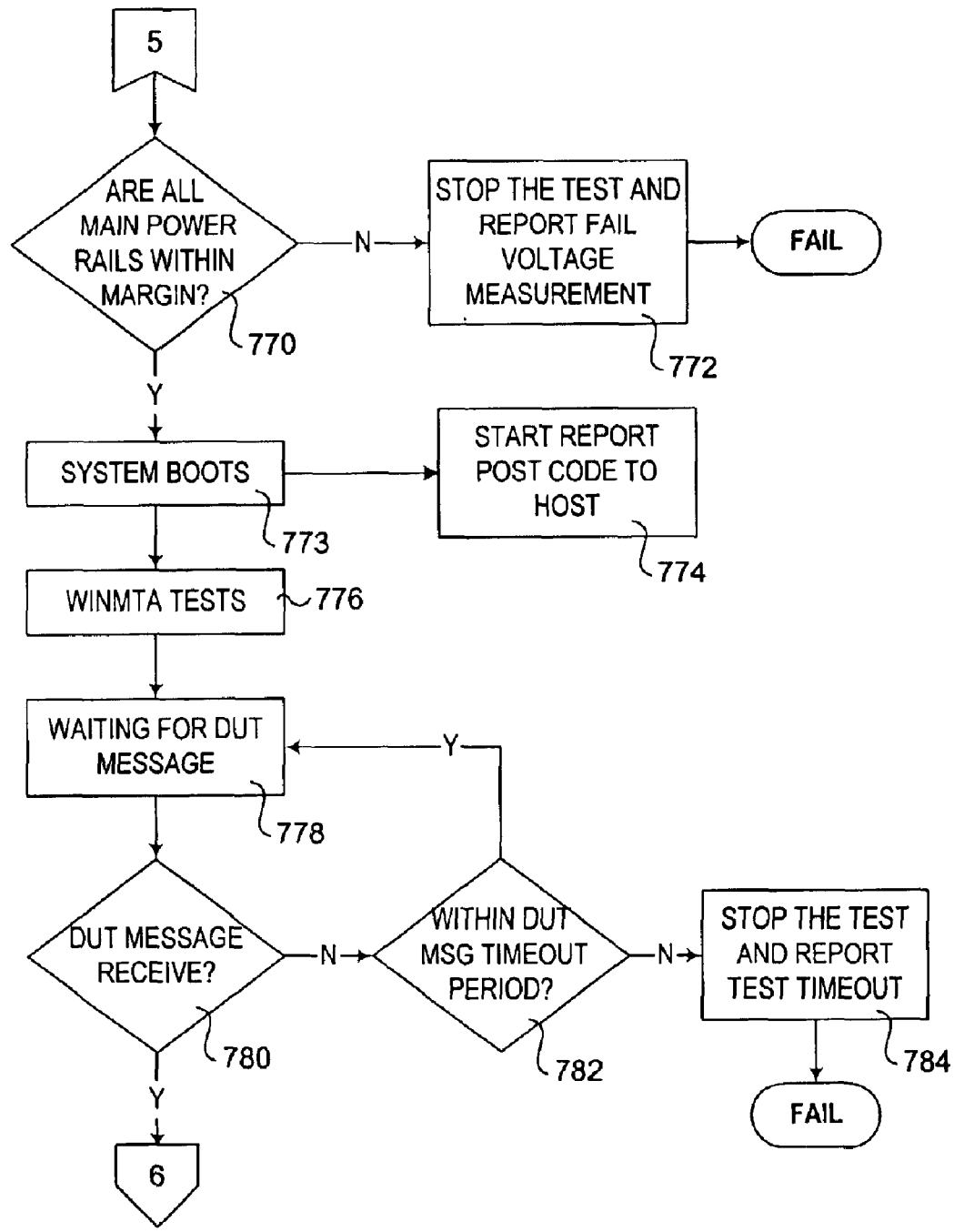
Figure 7G:
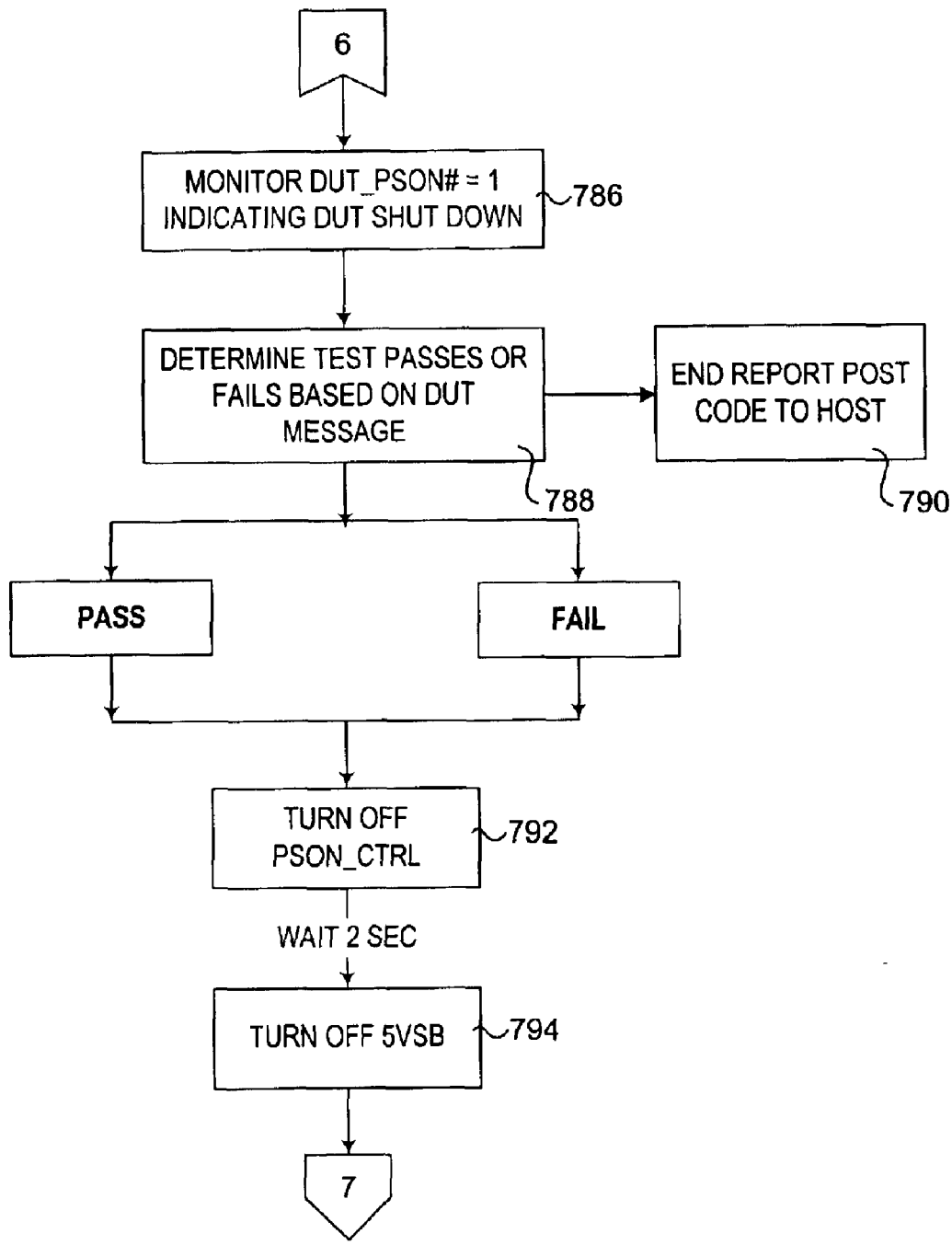

As shown at the top of FIG. 7d, the next operation comprises turning on the DUT 5V standby voltage (5VSB) in a block 744. After a two-second wait, a switch on control signal (SWON_CTROL) comprising a two-second SWON# pulse is generated in a block 746. In accordance with block 748 and 752 and a decision block 750, once the SWON# pulse is generated, the UHC software monitors for the occurrence of a power supply on (low) signal from the DUT (DUT_PSON#). If a DUT_PSON# low signal is not detected within two seconds, the test and stopped and corresponding information is reported.

In response to receiving a low DUT_PSON# signal, a PSON_CTRL (power supply on control) signal is immediately driven to high in a block 753, and the time is recorded (T1). Next, as shown by a block 754 at the top of FIG. 7e, the power supply is turned on, and the UHC software monitors for a DUT power OK (DUT_PWROK) signal in a block 756. If a DUT_PWROK (high) signal is not detected, the test is stopped and a corresponding report is made in accordance with a decision block 758 and a block 760. Once the DUT_PWROK signal goes high, the time is records (T2) in a block 762, and a determination is made in a decision block 764 to whether or not the DUT_PWROK timing (i.e., T2–T1) is within the timing specification. If it is not, the test is stopped and a corresponding report is made in a block 766.

Next, a DUT voltage measurement is made in a block 768. Generally, this measurement is made to verify that all of the main power rails (5VSB, 5V, 3.3V and 12V) are within the voltage margin specified by the initialization file. As determined in a decision block 770 at the top of FIG. 7f, if any of the power values are outside of the voltage margin (i.e., too high or too low), the test is stopped and a corresponding voltage measure failure report is made in a block 772.

In a block 773 the system boots, and POST (Power On Self Test) codes begin to be reported in a block 774. In one embodiment, the DUT boots into a Microsoft Windows operating system, such as Windows 2000. Accordingly, Windows tests based on a Windows-based Modular Test Architecture (winMTA) are executed in block 776, governed by the WinMTA test executive. WinMTA is a test executive software that controls the individual test modules to be run on the DUT. Test modules are developed separately and the WinMTA software executes them and reports the results to UHC. In accordance with a block 778 and decision block 780 and 782, the UHC software monitors for a DUT message, and determines if such is received within a predefined timeout period. If the DUT message is not received prior to completion of the timeout period, the test is stopped and a test timeout result together with the POST code information is reported in a block 784. The DUT will send all test results to the UHC.

Once the UHC software receives a TEST ENDED message (MID_TEST_ENDED) from the DUT, it will start monitoring for a DUT_PSON#=1 signal, indicating the DUT has shut down, as depicted by a block 786. This ends reporting of the POST code to the host, as depicted by a block 790. A determination is made in a block 788 to whether the DUT passed or failed the test and corresponding information is recorded. The power supply on control signal (PSON_CTROL) is then turned off in a block 792, a wait period of two seconds is performed, and the 5VSB signal is turned off in a block 794.

Figure 7H:
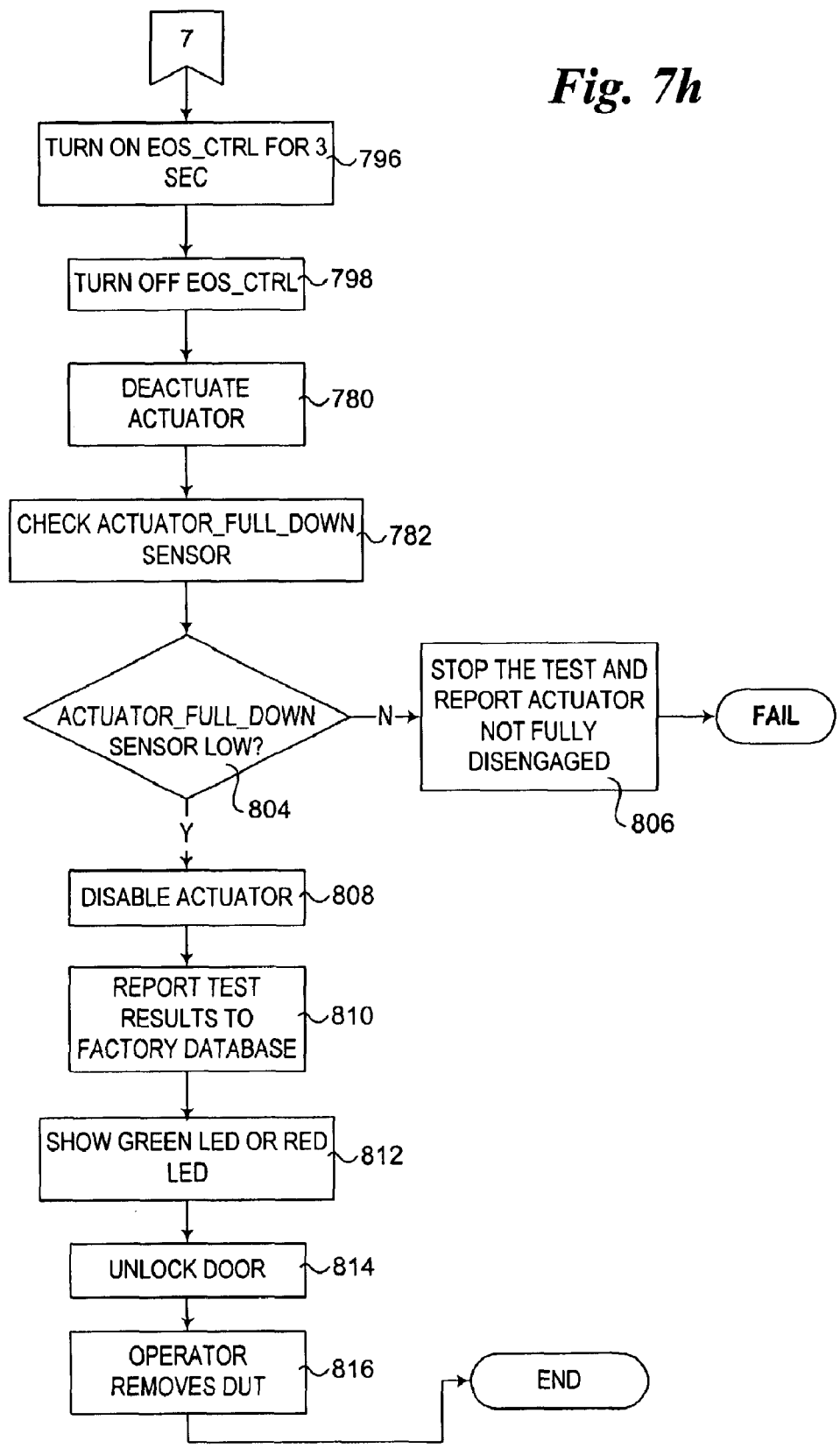

Continuing with blocks 796 and 798 at the top of FIG. 7h, an EOS_CTRL control signal is turned on for two hundred milliseconds and then turned off. In response, all the voltage rails (at this point already turned off) are tied together to ground to ensure that the DUT is totally discharged before being shipped. The actuator is deactuated in a block 800, and the ACTUATOR_FULL_DOWN sensor signal is checked in a block 802. If the ACTUATOR_FULL_DOWN sensor signal indicates that the actuator is not fully-disengaged, the answer to a decision block 804 is No, causing the test to be stopped in a block 806. An actuator not fully disengaged error message is then reported. If the sensor indicates proper actuator disengagement, the actuator is disabled in a block 808, and the test result is reported to the factory database in a block 810. Afterwards, a green or red LED is activated (as appropriate) in a block 812, door 134 is automatically unlocked in a block 814, thereby enabling the operator to remove the DUT in a block 816, completing the test cycle.

Figure 8:
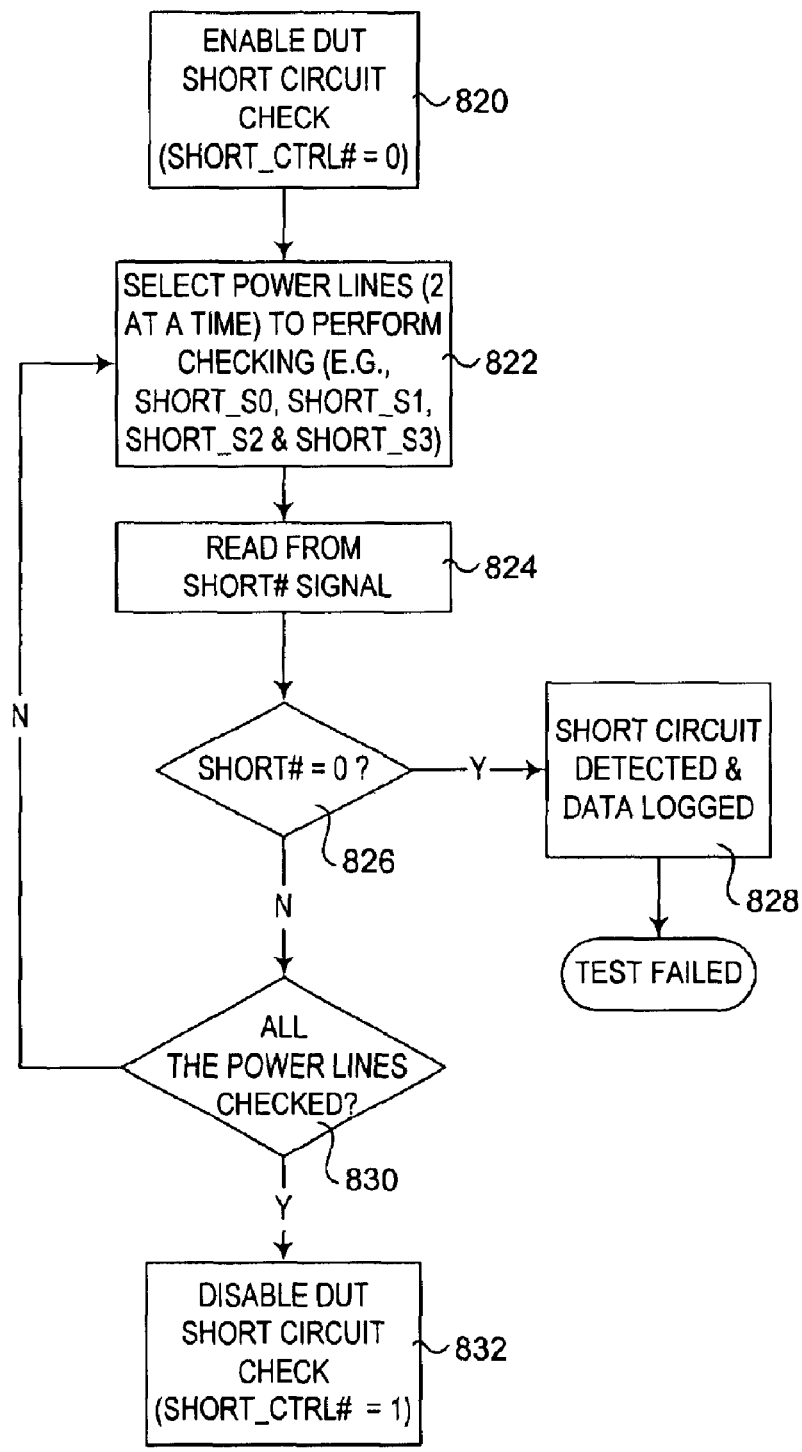
FIG. 8 is a flowchart illustrating operations and logic performed during an automated short circuit test.

Details of various operations performed during the optional short-circuit testing in accordance with an embodiment of the invention are illustrated by the flowchart of FIG. 8. In a block 820, the DUT short circuit check is enabled by setting a SHORT_CTRL# signal to 0). Next, in a block 822, two power lines are selected at a time (i.e., a power line and a common line), and a corresponding short circuit test is performed. In one embodiment, the power lines to check include 12V, 5V, 5VSB, and 3.3V. In a block 824, the SHORT# signal is read to determine whether a short circuit is indicated. If the SHORT#=0, a short circuit is detected in accordance with a decision block 826, and corresponding data are logged in a block 828. At a decision block 830 a determination is made to whether all of the power lines have been checked. If not, the logic returns to block 822, and the operations of block 822, 824, 826, and 828 are repeated for the next set of power lines. After all of the power lines have been checked, the DUT short circuit check is disabled in a block 812 by setting the DUT_CTRL#=1.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A controllable power supply comprising:
   a power supply to generate a plurality of internal power outputs;
   a communications interface; and
   a power supply control interface, operatively coupled to the communications interface and having respective power inputs coupled to the internal power outputs of the power supply and a plurality of power output connectors, said power supply control interface to control supply of external power outputs supplied at the power output connectors in response to power supply control commands received via the communications interface.

2. The controllable power supply of claim 1, wherein the communications interface comprises a universal serial bus (USB) interface.

3. The controllable power supply of claim 2, further comprising:
   a USB hub operatively coupled to the USB interface; and
   a plurality of USB communication ports, operatively coupled to the power supply control interface.

4. The controllable power supply of claim 1, wherein the power supply control interface comprises a circuit board including circuitry comprising power supply control logic programmed to control sequencing of the external power outputs in response to corresponding power supply control commands.

5. The controllable power supply of claim 4, wherein the circuit board includes a digital signal bus to which the circuitry of the power supply control logic is coupled, the apparatus further comprising a USB signal interface component operatively coupled to the power supply control interface to provide a communication signal interface between USB signals and digital signals sent over the digital signal bus.

6. The controllable power supply of claim 1, wherein the power supply control interface further includes circuitry to detect a short circuit in a device connected to at least one of the power output connectors.

7. The controllable power supply of claim 1, further including a system reset input operatively coupled to the power supply control interface, wherein the power supply control interface automatically shuts down at least one external power output in response to a shutdown signal received via the system reset input.

8. The controllable power supply of claim 1, wherein the power supply control interface further includes:
   an auxiliary communication port;
   circuitry comprising actuator control logic programmed to send actuator control signals via the auxiliary communication port in response to corresponding actuator commands received via the communications interface.

9. The controllable power supply of claim 1, further comprising an analog-to-digital conversion component operatively coupled to the external power outputs to measure a voltage level of each external power output.

10. The controllable power supply of claim 1, further comprising a housing in which the power supply and power supply control interface are disposed.

11. The controllable power supply of claim 10, wherein the housing conforms to a standard rack-mountable form factor.

12. The controllable power supply of claim 10, wherein the power supply comprises an ATX-compatible power supply.

13. A controllable power supply comprising:
   a power supply to supply a plurality of internal power outputs at respective voltage levels via at least one power cable;
   a universal serial bus (USB) communications interface; and
   a power supply interface board, operatively coupled to the USB communications interface and including:
      at least one respective power input connector to which said at least one power cable is coupled;
      a plurality of power output connecters via which respective external power outputs are supplied; and
      circuitry comprising power supply control logic programmed to control the external power outputs in response to power supply control commands received via the USB communications interface.

14. The controllable power supply of claim 13, wherein the power supply interface board further includes:
   a USB hub operatively coupled to the USB communications interface; and a plurality of USB communication ports, coupled to the USB hub, including an input USB port via which the power supply control commands are received.

15. The controllable power supply of claim 13, wherein the power supply interface board includes a digital signal bus and the apparatus further comprises a USB signal interface board operatively coupled to the power supply interface board to provide a communications interface by which circuit components connected to the digital signal bus may be communicated with via USB signals.

16. The controllable cower supply of claim 13, wherein the power supply interface board further includes circuitry comprising short circuit check logic operatively coupled to at least one power output connector to detect a short circuit in a device connected to said at lease one power output connector.

17. The controllable power supply of claim 13, wherein the power supply interface board further includes:
   an auxiliary communication port; and
   circuitry to perform actuator control logic operations, operatively coupled to the auxiliary communication port, to generate actuator control signals in response to corresponding actuator commands received via the USB communications interface.

18. The controllable power supply of claim 13, further comprising an analog-to-digital conversion component operatively coupled to at least one external power output to measure a voltage level of said at least one external power output.

19. The controllable power supply of claim 18, wherein the circuitry for the power supply control logic is operatively coupled to the analog-to-digital conversion component and is programmed to monitor the voltage level(s) of said at least one external power output via the analog-to-digital conversion component and to disable at least one external power output upon detection of an external power output voltage level falling outside an upper or lower voltage limit defined for that external power output.

20. The controllable power supply of claim 13, further comprising a housing in which the power supply and power supply interface board are mounted.

21. The controllable power supply of claim 13, wherein the plurality of power output connectors include a 2×10 ATX connector.

22. The controllable power supply of claim 21, wherein the power supply comprises an ATX12V power supply, and the plurality of power output connectors include a connector via which an ATX12V power output may be supplied.

23. The controllable power supply of claim 13, wherein the power supply further includes a peripheral device external power output having a voltage level suitable for powering computer system peripheral devices.

24. A method for supplying power input to a device under test (DUT) comprising:
    receiving a power supply command at a controllable power supply via a universal serial bus (USB) interface; and
    controlling a voltage level provided at each of a plurality of power outputs of the controllable power supply in response to the power supply command.

25. The method of claim 24, further comprising:
    monitoring a voltage level at each of the plurality of power outputs; and
    automatically shutting down a power output in response to determining that the voltage level of that power output falls outside an upper or lower voltage limit defined for that power output.

26. The method of claim 24, further comprising selectively providing input power to the DUT via the controllable power supply according to a power-up sequence particular to the DUT.

27. The method of claim 26, wherein the DUT comprises a computer system board, the method further comprising:
    providing an initial power input to the DUT;
    monitoring power control signals produced by DUT; and
    in response thereto,
    generating corresponding power supply commands and sending the power supply commands to the controllable power supply.

28. The method of claim 24, further comprising:
    converting the power supply command received from a USB-formatted signal to a digital input/output signal;
    supplying the digital input/output signal to a power supply control component in the controllable power supply; and
    controlling at least one power output via the power supply control component in response to the digital input/output signal.

29. The method of claim 24, further comprising:
    linking a first controllable power supply in communication with a second controllable power supply via a USB link,
    receiving a power supply command at the first controllable power supply;
    forwarding the power supply command from the first controllable power supply to the second controllable power supply via the USB link; and
    processing the power supply command at the second controllable power supply to control a plurality of power outputs produced by the second controllable power supply.

30. The method of claim 24, further comprising:
    sending an actuator command to the controllable power supply via the USB interface; and
    sending a corresponding actuator command signal from the controllable power supply to an actuator employed by testing equipment used to test the DUT.

* * * * *